(12) United States Patent
Tang et al.

(10) Patent No.: US 9,430,068 B2
(45) Date of Patent: Aug. 30, 2016

(54) TOUCH SCREEN

(71) Applicant: SHENZHEN O-FILM TECH CO., LTD, Shenzhen (CN)

(72) Inventors: Genchu Tang, Shenzhen (CN); Shengcai Dong, Shenzhen (CN); Wei Liu, Shenzhen (CN); Bin Tang, Shenzhen (CN)

(73) Assignee: Shenzhen O-Film Tech Co., Ltd., Shenzhen (CN)

(*) Notice: Subject to any disclaimer, the term of this patent is extended or adjusted under 35 U.S.C. 154(b) by 124 days.

(21) Appl. No.: 13/968,360

(22) Filed: Aug. 15, 2013

(65) Prior Publication Data

US 2015/0002755 A1    Jan. 1, 2015

Related U.S. Application Data

(63) Continuation of application No. PCT/CN2013/079292, filed on Jul. 12, 2013.

(30) Foreign Application Priority Data

Jul. 1, 2013    (CN) .......................... 2013 1 0272530

(51) Int. Cl.
*G06F 3/041*    (2006.01)

(52) U.S. Cl.
CPC ...... *G06F 3/041* (2013.01); *G06F 2203/04103* (2013.01)

(58) Field of Classification Search
CPC ......... G08C 21/00; G06F 3/041; G06F 3/042; G06F 3/043; G06F 3/044; G06F 3/045; G06F 3/046
USPC ............................... 178/18.01; 345/173–178
See application file for complete search history.

(56) References Cited

U.S. PATENT DOCUMENTS

2011/0050620 A1*    3/2011    Hristov ................. G06F 3/0416
                                                          345/174
2011/0102370 A1*    5/2011    Kono ...................... G06F 3/044
                                                          345/174

(Continued)

FOREIGN PATENT DOCUMENTS

CN          201725303 U      1/2011
CN          102645996 A      8/2012

(Continued)

OTHER PUBLICATIONS

Korean Examination Report of corresponding Republic of Korea patent Application No. 10-2013-7026487, dated Sep. 30, 2014.

(Continued)

*Primary Examiner* — Kent Chang
*Assistant Examiner* — Mark Edwards
(74) *Attorney, Agent, or Firm* — Hodgson Russ LLP

(57) ABSTRACT

A touch screen, includes a substrate, a first embossing adhesive layer, a first metal conductive layer, a first electrode lead, a transparent insulating film, a second embossing adhesive layer, a second metal conductive layer and a second electrode lead, and has low material cost since the conductive layers are made of metal materials; a first slot is provided in the transparent insulating film, a second slot is provided in the second embossing adhesive layer, the first slot and the second slot directly face a free end of the first electrode lead, and a free end of the second electrode lead is positioned around the second slot, thus the free ends of the first and second electrode leads are exposed to the same side of the substrate and electrically connected with a circuit board, thus simplifying adhering process and structural design of the circuit board, and reducing manufacturing cost.

8 Claims, 7 Drawing Sheets

(56) References Cited

U.S. PATENT DOCUMENTS

| | | | | |
|---|---|---|---|---|
| 2012/0327021 A1* | 12/2012 | Ryu | ........................ | G06F 3/044 345/174 |
| 2012/0329525 A1* | 12/2012 | Hashimoto | ............. | C03C 15/00 455/566 |
| 2013/0004778 A1* | 1/2013 | Tucker, III | ........... | C09D 183/14 428/426 |
| 2014/0152917 A1* | 6/2014 | Lee | ......................... | G06F 3/044 349/12 |
| 2014/0209237 A1* | 7/2014 | Ogawa | .................... | G02F 1/133 156/273.5 |

FOREIGN PATENT DOCUMENTS

| | | | | |
|---|---|---|---|---|
| CN | 102930922 A | 2/2013 | | |
| CN | 103105970 A | 5/2013 | | |
| CN | 203338283 U | 12/2013 | | |
| CN | 103345317 B | 10/2014 | | |
| JP | 2010-191741 A | 9/2010 | | |
| KR | 10-1042553 | 6/2011 | | |
| KR | 101042553 B | * 6/2011 | .............. | G06F 3/041 |
| KR | 101042553 B1 | * 6/2011 | | |
| KR | 10-2012-0040032 | 4/2012 | | |
| KR | 10-2012-0072187 | 7/2012 | | |
| KR | 10-2012-0121573 | 11/2012 | | |

OTHER PUBLICATIONS

Chinese International Search Report of corresponding International PCT Application No. PCT/CN2013/079292, dated Mar. 27, 2014.

Chinese First Examination Report of corresponding China Application No. 201310272530.7, dated Feb. 20, 2014.

* cited by examiner

TOUCH SCREEN

CROSS-REFERENCE TO RELATED APPLICATIONS

This application is a continuation of International Application No. PCT/CN2013/079292, filed on Jul. 12, 2013, which claims the priority benefit of Chinese Patent Application No. 201310272530.7, filed on Jul. 1, 2013, both of which are hereby incorporated by reference in their entireties.

FIELD OF THE INVENTION

The present invention relates to the field of electronic technology, and specifically to a touch screen.

BACKGROUND OF THE INVENTION

A touch screen serves as an inductive device capable of receiving an input signal such as a touch. The touch screen is a new information interaction device that gives information interaction a new appearance. In a conventional touch screen, indium tin oxides (Indium Tin Oxides, ITO) conductive layer is a crucial component of a touch screen induction module.

Generally, in preparation of the ITO layer, the entire surface of a substrate is required to be coated with ITO, and then ITO pattern is formed to obtain an electrode, and finally a transparent electrode silver lead is made. During the ITO patterning, etching process is needed for etching the formed ITO film, while the ITO is an expensive material, the patterning may cause a lot of waste of the ITO, and result in high production cost.

SUMMARY OF THE INVENTION

Based on this, for the problem of high production cost, it is necessary to provide a touch screen which can reduce cost.

A touch screen, includes a substrate, and further includes:

a first embossing adhesive layer, formed on a side of the substrate, where a first metal conductive layer is embedded in the first embossing adhesive layer, the first metal conductive layer includes a plurality of first conductive strips mutually insulated from each other;

a first electrode lead, formed on the first embossing adhesive layer and electrically connected with the first conductive strip;

a transparent insulating film, including a first surface and a second surface opposite to the first surface, where the first surface faces the first embossing adhesive layer;

a second embossing adhesive layer, formed on the second surface of the transparent insulating film, where a second metal conductive layer is embedded in the second embossing adhesive layer, the second metal conductive layer includes a plurality of second conductive strips mutually insulated from each other;

a second electrode lead, formed on the second embossing adhesive layer and electrically connected with the second conductive strip;

a first slot provided in the transparent insulating film, and a second slot provided in the second embossing adhesive layer, where the first slot and the second slot both directly face a free end of the first electrode lead, and a free end of the second electrode lead is positioned around the second slot.

In one embodiment, the first conductive strip and the second conductive strip each include a conductive grid composed of a plurality of metal wires, where projection of the conductive grid of the first conductive strip on the second metal conductive layer overlaps the conductive grid of the second conductive strip.

In one embodiment, the touch screen further includes an optical transparent adhesive layer, the optical transparent adhesive layer is provided between the first embossing adhesive layer and the first surface of the transparent insulating film, wherein a third slot is provided in the optical transparent adhesive layer and directly faces the free end of the first electrode lead.

In one embodiment, a first patterned groove is provided on a side of the first embossing adhesive layer away from the substrate, where the metal wires of the first metal conductive layer are accommodated in the first groove; and a second patterned groove is provided on a side of the second embossing adhesive layer away from the second surface of the transparent insulating film, where the metal wires of the second metal conductive layer are accommodated in the second groove.

In one embodiment, a depth to width ratio of the first groove is not less than 1, and a depth to width ratio of the second groove is not less than 1.

In one embodiment, the substrate is soda lime glass or aluminosilicate glass, and siloxy of a surface of the substrate adjacent to the first embossing adhesive layer is bonded with the first embossing adhesive layer.

In one embodiment, roughness of the surface of the substrate adjacent to the first embossing adhesive layer is 5~10 nm.

In one embodiment, metal wires of the first conductive strip are attached to the substrate, and the first conductive strip is located between the substrate and the first embossing adhesive layer.

In one embodiment, a strip-shaped first connecting portion is provided at an end of the first electrode lead adjacent to the first conductive strip, where the first connecting portion is electrically connected with at least two metal wires of the first conductive strip; and a strip-shaped second connecting portion is provided at an end of the second electrode lead adjacent to the second conductive strip, where the second connecting portion is electrically connected with at least two metal wires of the second conductive strip.

In one embodiment, the first connecting portion is wider than other parts of the first electrode lead, and the second connecting portion is wider than other parts of the second electrode lead.

In one embodiment, the first electrode lead and the second electrode lead are both a grid structure formed by crossconnecting of conductive wires in a grid.

In one embodiment, a grid cycle of the first electrode lead and the second electrode lead are less than a grid cycle of the first metal conductive layer and the second metal conductive layer.

In one embodiment, a first electrode tieline is provided between the first electrode lead and the first conductive strip, and a second electrode tieline is provided between the second electrode lead and the second metal conductive layer, and the first electrode tieline and the second electrode tieline are continuous conductive wires.

Since the conductive layers are made of metal materials, the above described touch screen has relatively low cost of materials with respect to the ITO. At the same time, the first slot is provided in the transparent insulating film of the above described touch screen, the second slot is provided in the second embossing adhesive layer, the first slot and the second slot face directly to the free end of the first electrode lead, and the free end of the second electrode lead is provided around the second slot, thus the free ends of the first electrode lead and the second electrode lead are all exposed to the same side of the substrate, so that the free ends of the first electrode lead and the second electrode lead are electrically connected with a circuit board simultaneously, not only simplifying adhering process of the circuit board, but also simplifying structural design of the circuit board, and further reducing manufacturing cost of the touch screen.

DETAILED DESCRIPTION OF THE EMBODIMENTS

In order to facilitate understanding of the present invention, a comprehensive description of the present invention is given with reference to the accompanying drawings. The accompanying drawings show preferred embodiments of the present invention. However, the present invention may be implemented in many different forms, not limited to embodiments described herein. On the contrary, these embodiments are provided aiming to make disclosure of the present invention is more thorough and comprehensive.

Unless otherwise defined, all technical and scientific terms used herein have the same meaning as those commonly understood by persons skilled in the art to which the present invention pertains. Terms in specification of the present invention are merely used for describing specific embodiments, not intended to limit the present invention. As used herein, the term "and/or" includes any and all of combinations of one or more of associated listed items.

"Transparent" in transparent insulating film may be understood as "transparent" and "substantially transparent" in the present invention; "insulating" in the transparent insulating film may be understood as "insulated" and "dielectric (dielectric)" in the present invention, therefore the "transparent insulating film" in the present invention should be understood as, including but not limited to, transparent insulating film, substantially transparent insulating film, transparent dielectric film and substantially transparent dielectric film.

Figure 1:
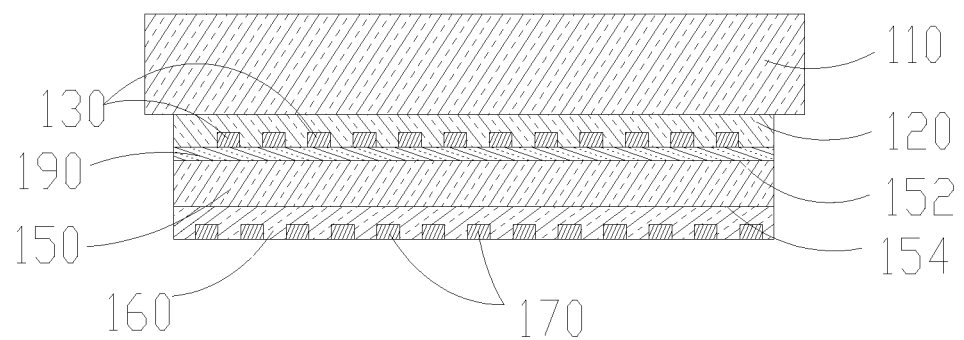
FIG. 1 is a schematic structural diagram of a touch screen according to one embodiment.
Figure 2:
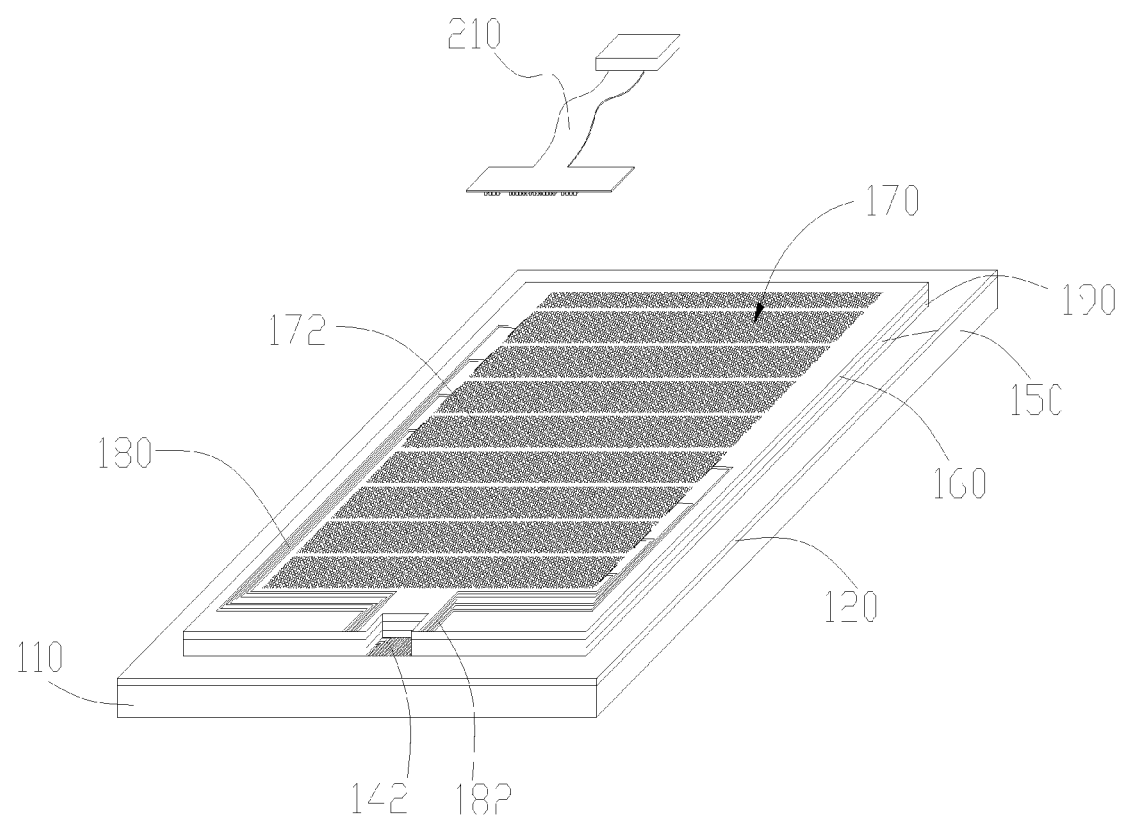
FIG. 2 is an exploded perspective diagram of the touch screen shown in FIG. 1.
Figure 3:
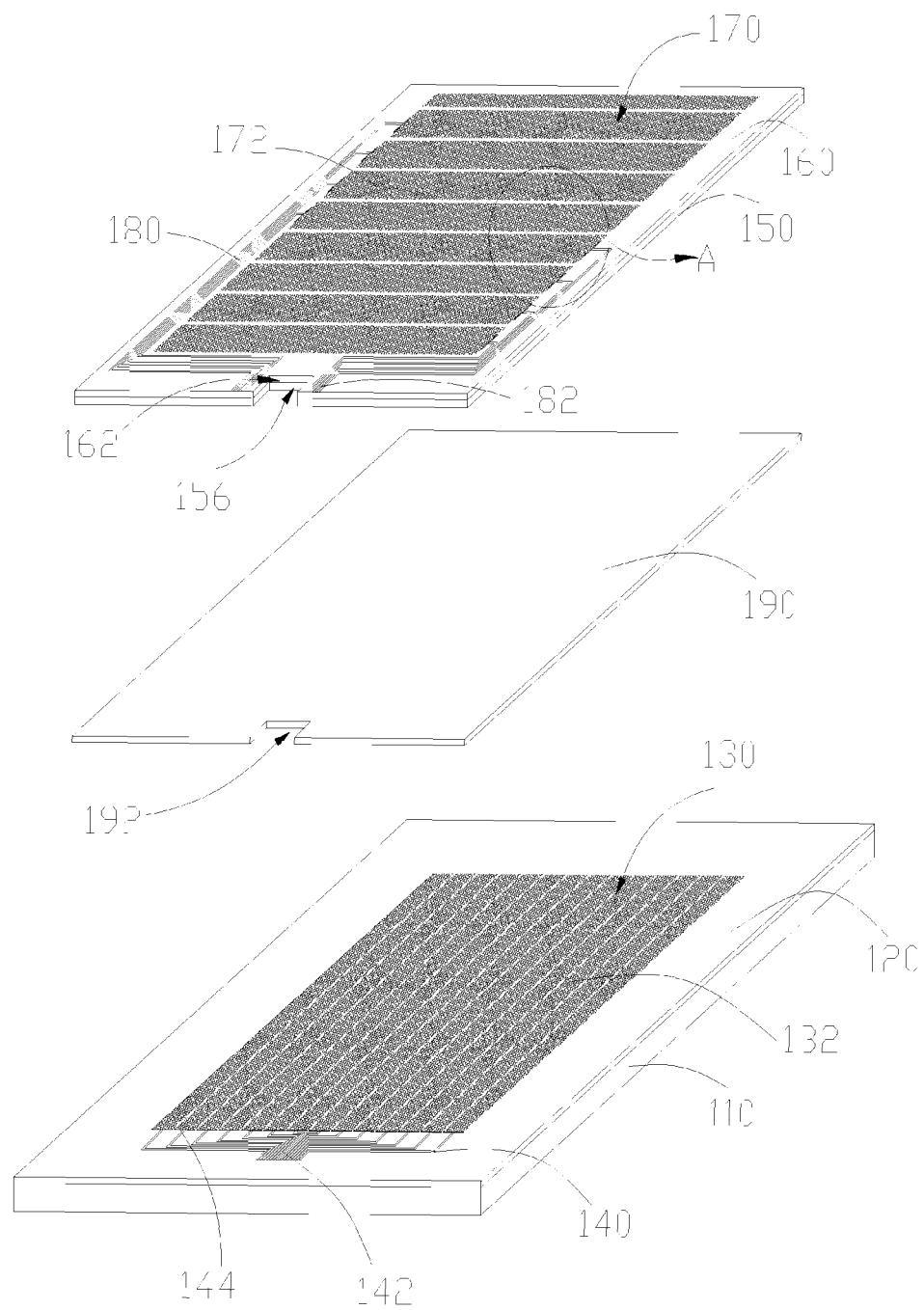
FIG. 3 is an assembled perspective diagram of the touch screen shown in FIG. 1.

In an embodiment shown in FIG. 1, FIG. 2 and FIG. 3, a touch screen includes a substrate 110, a first embossing adhesive layer 120, a first metal conductive layer 130, a first electrode lead 140, a transparent insulating film 150, a second embossing adhesive layer 160, a second metal conductive layer 170 and a second electrode lead 180.

Where the first embossing adhesive layer 120 is formed on a side of the substrate 110, the first metal conductive layer 130 is embedded in the first embossing adhesive layer 120, and the first metal conductive layer 130 includes a plurality of first conductive strips 132 mutually insulated from each other; the first electrode lead 140 is formed on the first embossing adhesive layer 120 and electrically connected with the first conductive strip 132; the transparent insulating film 150 includes a first surface 152 and a second surface 152 opposite to the first surface 154, where the first surface 152 faces toward the first embossing adhesive layer 120; the second embossing adhesive layer 160 is formed over the second surface 154 of the transparent insulating film 150, the second metal conductive layer 170 is embedded in the second embossing adhesive layer 160, and the second metal conductive layer 170 includes a plurality of second conductive strips 172 mutually insulated from each other; the second electrode lead 180 is formed on the second embossing adhesive layer 160 and electrically connected with the second conductive strip 172; a first slot 156 is provided in the transparent insulating film 150, and a second slot 162 is provided in the second embossing adhesive layer 160, where the first slot 156 and the second slot 162 both face directly to a free end 142 of the first electrode lead 140, and a free end 182 of the second electrode lead 180 is provided around the second slot 162.

In the above described touch screen, the first embossing adhesive layer 120 is formed on a side of the substrate 110, the first metal conductive layer 130 is embedded in the first embossing adhesive layer 120, the second embossing adhesive layer 160 is formed on the second surface 154 of the transparent insulating film 150, the second metal conductive layer 170 is embedded in the second embossing adhesive layer 160, and then the first surface 152 of the transparent insulating film 150 is adhered to the side of the substrate 110 over which the first embossing adhesive layer 120 is formed. Thus, since the conductive layers are made of metal materials, cost of materials is relatively low with respect to ITO.

Where the transparent insulating film 150 and the second embossing adhesive layer 160 are both located above the first embossing adhesive layer 120, the first electrode lead 140 is formed on the first embossing adhesive layer 120, the first slot 156 is provided in the transparent insulating film 150, the second slot 162 is provided in second embossing adhesive layer 160, the first slot 156 and the second slot 162 both face directly to the free end 142 of the first electrode lead 140, and the free end 182 of the second electrode lead 180 is provided around the second slot 162. In preparation of the touch screen, the first electrode lead 140 is used to electrically connect the first metal conductive layer 130 to printed circuit board (Flexible Printed Circuit Board, FPCB) 210 of the touch screen, the second electrode lead 180 is used to electrically connect the second metal conductive layer 170 to FPCB 210 of the touch screen, so that the FPCB 210 can sense operation on the touch screen. Thus, the first slot 156 and the second slot 162 are provided so that the free end 142 of the first electrode lead 140 is exposed, and then the free end 182 of the second electrode lead 180 is provided around the second slot 162, thereby the free end 142 of the first electrode lead 140 and the free end 182 of the second electrode lead 180 are exposed to the same side of the substrate 110, so that the free end 142 of the first electrode lead 140 and the free end 182 of the second electrode lead 180 can be connected with the FPCB 210 simultaneously, not only simplifying adhering process of the FPCB 210, but also simplifying structural design of the FPCB 210, and further reducing manufacturing cost of the touch screen.

Where an end of the first electrode lead 140 is electrically connected with the first conductive strip 132, while the other end used for being connected with the FPCB 210 is the free end 142 of the first electrode lead 140; an end of the second electrode lead 180 is electrically connected with the second conductive strip 172, while the other end used for being connected with the FPCB 210 is the free end 182 of the second electrode lead 180.

Where the first electrode lead 140 is formed on the first embossing adhesive layer 120 and electrically connected with the first conductive strip 132; the second electrode lead 180 is formed on the second embossing adhesive layer 160 and electrically connected with the second conductive strip 172. Materials used for preparing the first metal conductive layer 130 and the second metal conductive layer 170 may be gold, silver, copper, aluminum, nickel, zinc, or one of alloys made of at least two of them. It can be understood that corresponding function may be achieved only if the materials for preparing the first metal conductive layer 130 and the second metal conductive layer 170 are electrical conductors, such as carbon nanotube, graphene, conductive macromolecules and so on.

Where the material for forming the first embossing adhesive layer 120 and the second embossing material layer 160 may be solvent-free UV-curable acrylic resin, light curing adhesive, thermosetting adhesive and self-dry adhesive. Where the light curing adhesive is a mixture of prepolymer, monomer, photoinitiator and additives in a molar ratio of 30~50%, 40~60%, 1~6% and 0.2~1%. Where the prepolymer is selected as at least one of epoxy acrylate, urethane acrylates, polyether acrylate, polyester acrylate, and acrylic resin; the monomer is at least one of monofunctional (IBOA, IBOMA, HEMA, etc.), bifunctional (TPGDA, HDDA, DEGDA, NPGDA, etc.), tri-functional and multi-functional (TMPTA, PETA, etc.) monomer; the photoinitiator is benzophenone, dihydroxyacetophenone, etc. Further, optionally additives may be added in the above mixture, where its molar ratio is 0.2~1%. The additives may be hydroquinone, p-methoxyphenol, p-benzoquinone, or 2,6-di-tert-butyl-methylphenol.

Where the material of the substrate 110 is glass, the material of the transparent insulating film 150 may be polyethylene terephthalate (PET) film which is an insulating material. It should be noted that in other embodiments, the substrate 110 and the transparent insulating film 150 can be other materials, such as polybutylene terephthalate (PBT), polymethyl methacrylate (PMMA), polycarbonate plastic (PC) and so on.

Figure 5:
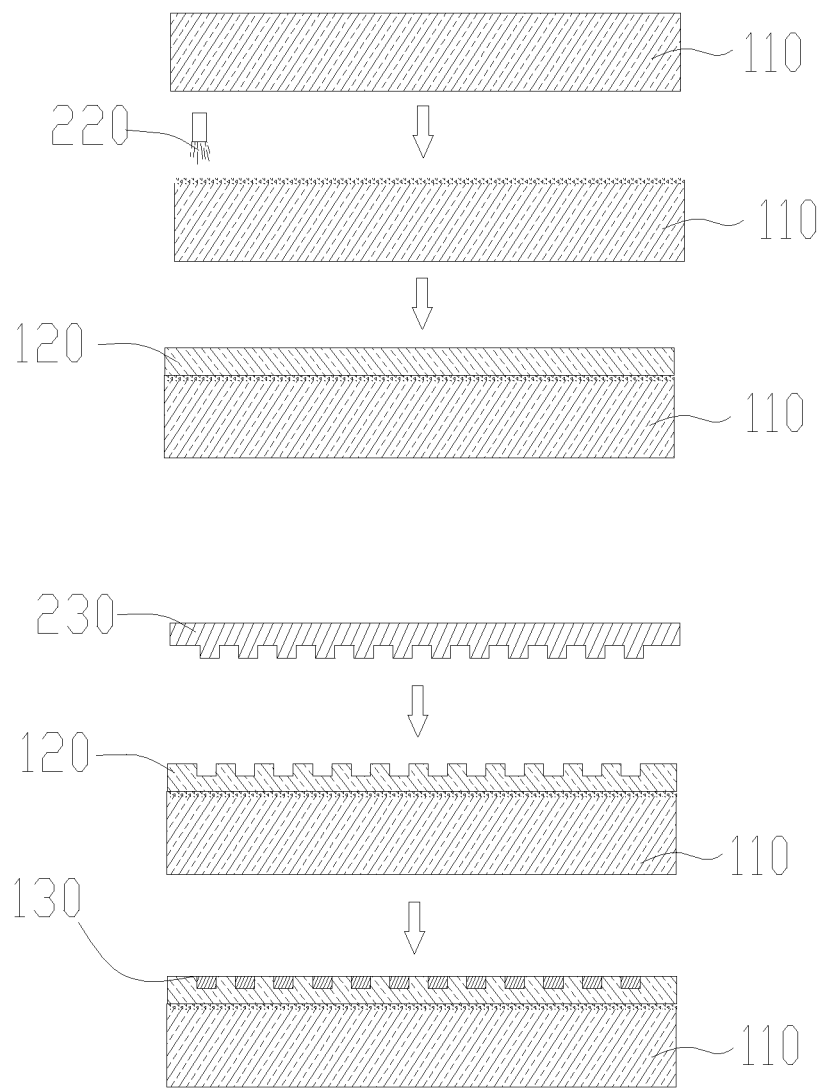
FIG. 5 is a partial flow chart of manufacture of the touch screen shown in FIG. 1.

In the specific embodiment shown in FIG. 1 and FIG. 5, the first embossing adhesive layer 120 is formed on a side of the substrate 110, and the first metal conductive layer 130 is embedded in the first embossing adhesive layer 120. A first patterned groove is provided on the side of the first embossing adhesive layer 120 away from the substrate 110, the first metal conductive layer is accommodated in the first groove, and the shape of the first metal conductive layer 130 matches with the shape of the first groove. The first embossing adhesive layer 120 is formed on a side of the substrate 110, the first groove is formed on the side of the first embossing adhesive layer 120 away from the substrate 110 through embossing by an embossing mould 230, and then the material for forming the first metal conductive layer 130 is filled into the first groove, and the first metal conductive layer 130 is formed through sintering process. Since the first groove may be embossed into a preset shape upon demand of the shape of the electrode, the first metal conductive layer 130 accommodated in the first groove may be molded directly into the preset shape without being etched, thereby simplifying fabrication process, avoiding a substantial waste of materials, and reducing the cost. And since etching process is not needed in the above described production process of the touch screen, chemical substances can be avoided in the production process, thereby avoiding environmental pollution.

Where a depth to width ratio of the first groove can be set reasonably to not less than 1, so as to prevent the material of the first metal conductive layer 130 from being damaged during sintering embossing process after being filled into the first groove.

In other embodiments, metal wires of the first conductive strip 132 are attached to the substrate 110, and the first conductive strip 132 is located between the substrate 110 and the first embossing adhesive layer 120. Specifically, metal wires for forming the first conductive strip 132 are used to coat metal film on one side of the substrate 110, and then the first conductive strip 132 is formed through exposure and developing, thereby forming the first metal conductive layer 130. In this way, on one hand, the conductive layer uses metal replacing ITO, which reduces the cost, on the other hand the metal film can reach nanoscale, which improves yield. Since glass has excellent coating properties, the substrate 110 which is made of the glass can make the coated metal film transparency, which can further improve light transmittance of the touch screen.

In the specific embodiment shown in FIG. 1 and FIG. 5, the second embossing adhesive layer 160 is formed on the second surface 154 of the transparent insulating film 150, and the second metal conductive layer 170 is embedded in the second embossing adhesive layer 160. A second patterned groove is provided on the side of the second embossing adhesive layer 160 away from the second surface 154 of the transparent insulating film 150, the second metal conductive layer is accommodated in the second groove, and the shape of the second metal conductive layer 170 matches with the shape of the second groove. The second embossing adhesive layer 160 is formed on the second surface 154 of the transparent insulating film 150, the second groove is formed on the side of the second embossing adhesive layer 160 away from the second surface 154 of the transparent insulating film 150 through embossing, and then the material for forming the second metal conductive layer 170 is filled into the second groove, and the second metal conductive layer 170 is formed through sintering process. Since the second groove may be embossed into a preset shape upon demand of the shape of the electrode, the second metal conductive layer 170 accommodated in the second groove may be molded directly into the preset shape without being etched, thereby simplifying fabrication process, avoiding a substantial waste of materials, and reducing the cost. And since etching process is not needed in the above described production process of the touch screen, chemical substances can be avoided in the production process, thereby avoiding environmental pollution.

Where a depth to width ratio of the second groove can be set reasonably to not less than 1, so as to prevent the material of the second metal conductive layer 170 from being damaged during sintering embossing process after being filled into the second groove.

Refer to FIG. 5, in one embodiment, the substrate 110 is soda lime glass or silicate glass, and siloxy of the surface of the substrate 110 adjacent to the first embossing adhesive layer 120 is bonded with the first embossing adhesive layer 120. Prior to the first embossing adhesive layer 120 formed over the substrate 110, the surface of the substrate 110 adjacent to the first embossing adhesive layer 120 is bombarded by a plasma 220 to expose the siloxy, then the first embossing adhesive layer 120 is bonded with the siloxy, so as to bond the first embossing adhesive layer 120 with the substrate 110 better, and to improve the yield of the touch screen.

Refer to FIG. 5, in one embodiment, in order to increase bonding effect of the substrate 110 and the first embossing adhesive layer 120, the roughness of the surface of the substrate 110 adjacent to the first embossing adhesive layer 120 can be set reasonably to 5~10 nm.

Refer to FIG. 2 and FIG. 3, in one embodiment, an optical transparent adhesive layer 190 provided between the first embossing adhesive layer 120 and the first surface 152 of the transparent insulating film 150 is further included, where a third slot 192 is provided in the optical transparent adhesive layer 190 and faces directly to the free end 142 of the first electrode lead 140. The first embossing adhesive layer 120 is formed on a side of the substrate 110, the first metal conductive layer 130 is embedded in the first embossing adhesive layer 120, the second embossing adhesive layer 160 is formed on the second surface 154 of the transparent insulating film 150, the second metal conductive layer 170 is embedded in the second embossing adhesive layer 160, and then the first surface 152 of the transparent insulating film 150 is adhered to a surface of the substrate 110, where the first embossing adhesive layer 120 is formed on, via the optical transparent adhesive layer 190. The optical transparent adhesive layer 190 is provided to further enhance the adhesive strength of the substrate 110 and the transparent insulating film 150, which reduces the cost and improves the yield of the touch screen. Where the material of the optical transparent adhesive layer 190 may be OCA adhesive, UV adhesive, thermosetting adhesive or self-dry adhesive and so on, so as to ensure light transmission of the touch screen. Meanwhile, the third slot 192 is provided in the optical transparent adhesive layer 190 and faces directly to the free end 142 of the first electrode lead 140, aiming to expose the free end 142 of the first electrode lead 140.

Refer to FIG. 2 and FIG. 3, in one embodiment, the first conductive strip 132 and the second conductive strip 172 each include a conductive grid composed of a plurality of metal wires, where the projection of the conductive grid of the first conductive strip 132 on the second metal conductive layer 170 overlaps the conductive grid of the second conductive strip 172.

Specifically, nano-silver ink is filled into the first groove using blade coating technique, and then sintered at a condition of 150° C., so as to sinter the silver elementary substance in the nano-silver ink into conductive wires of the first conductive strip 132. Where solid content of the silver ink is 35%, and solvent volatilizes during sintering. Since the shape of the first groove is embossed into a desired pattern of the electrode in advance, no patterning operation is needed after the conductive grid of the first conductive strip 132 is formed, thereby saving materials and improving efficiency.

Specifically, nano-silver ink is filled into the second groove using blade coating technique, and then sintered at a condition of 150° C., so as to sinter the silver elementary substance in the nano-silver ink into conductive wires of the second conductive strip 172. Where solid content of the silver ink is 35%, and solvent volatilizes during sintering. Since the shape of the second groove is embossed into a desired pattern of the electrode in advance, no patterning operation is needed after the conductive grid of the second conductive strip 172 is formed, thereby saving materials and improving efficiency.

Where the projection of the conductive grid of the first conductive strip 132 on the second metal conductive layer 170 overlaps the conductive grid of the second conductive strip 172. The conductive wires for constituting the first conductive strip 132 and the second conductive strip 172 can be staggered at a distance from each other, thereby avoiding serious Moire fringe phenomenon.

Figure 6:
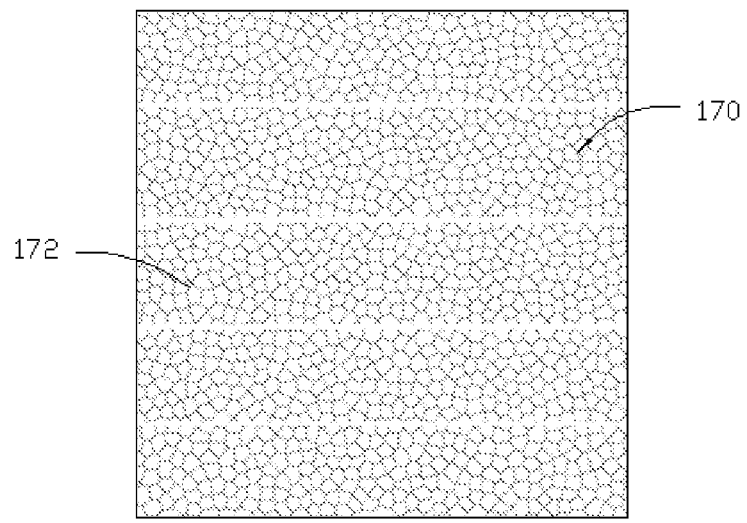
FIG. 6 is a schematic structural diagram of a second metal conductive layer of a touch screen according to one embodiment.

Moire fringe is an optical phenomenon that is a visual result of interference between two lines or between two objects at a constant angle and frequency, when human eyes cannot distinguish these two lines or two objects, and only can see interference pattern, such optical phenomenon is moire fringe.

Where the conductive grids of the first conductive strip 132 and the second conductive strip 172 all can be diamond, rectangle, parallelogram, curved quadrilateral or polygon, where the curved quadrilateral has four curved sides, with two opposite curved sides having the same shape and curve direction. In the specific embodiment shown in FIG. 4, the conductive grid of the second conductive strip 172 is a regular hexagon. In the specific embodiment shown in FIG. 6, the conductive grid of the second conductive strip 172 is an irregular polygon.

Figure 4:
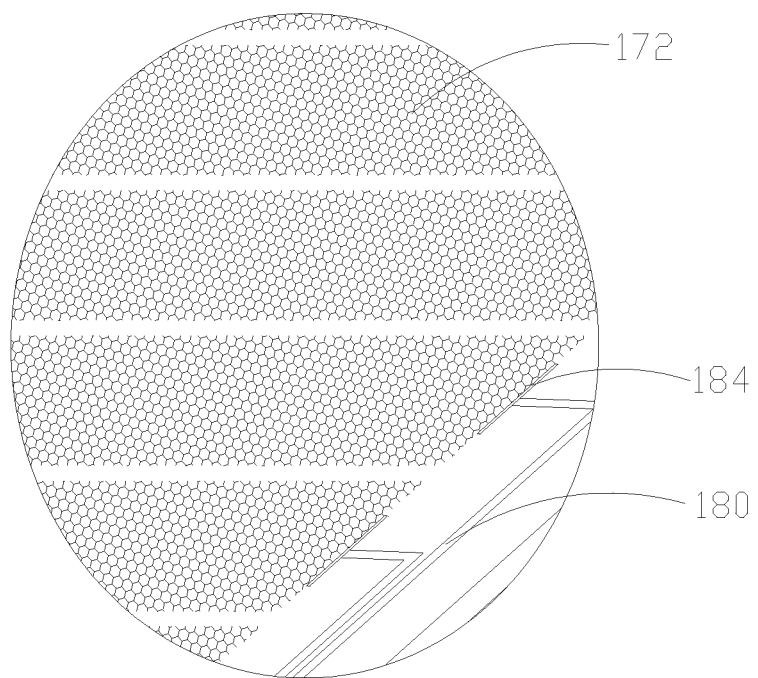
FIG. 4 is an enlarged schematic structural diagram at A shown in FIG. 3.

Refer to FIG. 3 and FIG. 4, in one embodiment, a strip-shaped first connecting portion 144 is provided at an end of the first electrode lead 140 adjacent to the first conductive strip 132, and a strip-shaped second connecting portion 184 is provided at an end of the second electrode lead 180 adjacent to the second conductive strip 172. In this way, the first electrode lead 140 is electrically connected with the first metal conductive layer 130 via the first connecting portion 144, and the second electrode lead 180 is electrically connected with the second metal conductive layer 170 via the second connecting portion 184. In order to enhance electrical connectivity of the first electrode lead 140 and the first metal conductive layer 130, and electrical connectivity of the second electrode lead 180 and the second metal conductive layer 170, the first connecting portion 144 is provided reasonably to be electrically connected with at least two metal wires of the first conductive strip 132, and the second connecting portion 184 is electrically connected with at least two metal wires of the second conductive strip 172.

Refer to FIG. 3 and FIG. 4, in one embodiment, the first connecting portion 144 is wider than other parts of the first electrode lead 140, and the second connecting portion 184 is wider than other parts of the second electrode lead 180. Since the first connecting portion 144 is wider than other parts of the first electrode lead 140, the contact area is relatively large, thereby making the first electrode lead 140 be electrically connected with a plurality of conductive wires of the first metal conductive layer 130, and further enhancing the electrical connectivity of the first electrode lead 140 and the first metal conductive layer 130. Since the second connecting portion 184 is wider than other parts of the second electrode lead 180, the contact area is relatively large, which can, in a similar way, enhance the electrical connectivity of the second electrode lead 180 and the second metal conductive layer 170. In this way, the yield is increased, and the cost is reduced.

Figure 7:
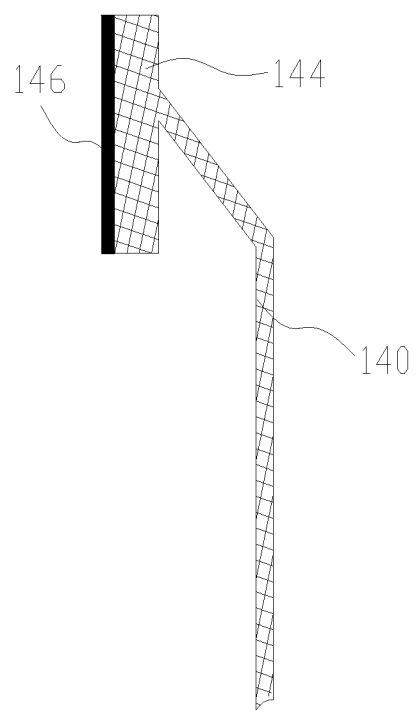
FIG. 7 is a schematic structural diagram of a first electrode lead of a touch screen according to one embodiment.
Figure 8:
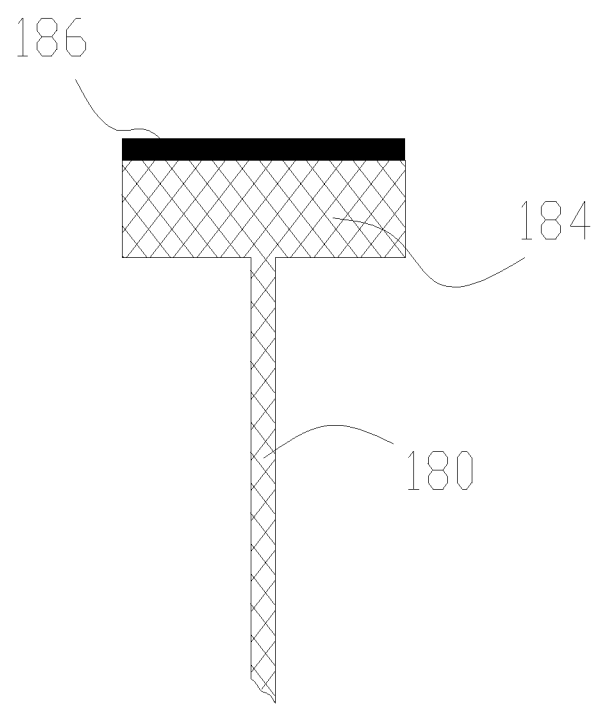
FIG. 8 is a schematic structural diagram of a second electrode lead of a touch screen according to one embodiment.

Refer to FIG. 7 and FIG. 8, in one embodiment, the first electrode lead 140 and the second electrode lead 180 are both a grid structure formed by cross-connecting of conductive wires in a grid. Specifically, the groove for accommodating the first/second electrode lead 180 is embossed in the first/second embossing adhesive layer 160, and then the material of the first/second electrode lead 180 is scraped and coated into the corresponding groove. By using the electrode lead with a grid structure, in blade coating process, the material of the electrode lead cannot be scraped off easily, which facilitates the operation of blade coating process. At the same time the condensation effect which may cause the lead break, can be prevented when the material of the first/second electrode lead 180 is in sintering process, thus improving the yield and reducing the cost. Where the material of the first/second electrode lead 180 may be nano-silver paste.

It could be understood that the first electrode lead 140 and the second electrode lead 180 may also be solid lines that can also achieve that the first metal conductive layer 130 and the second metal conductive layer 170 are both electrically connected with FPCB 210.

Refer to FIG. 3, FIG. 7 and FIG. 8, in one embodiment, grid cycles of the first electrode lead 140 and the second electrode lead 180 are both less than grid cycles of the first metal conductive layer 130 and the second metal conductive layer 170. The grid cycle is the size of the conductive grid. When the first electrode lead 140 and the second electrode lead 180 are electrically connected with the first metal conductive layer 130 and the second metal conductive layer 170, it is hard to avoid misalignment. In this way, the electrical connectivity of the first electrode lead 140 and the second electrode lead 180 with the first metal conductive layer 130 and the second metal conductive layer 170, can be enhanced, the yield can be improved, and the cost can be reduced.

Refer to FIG. 7 and FIG. 8, in one embodiment, a first electrode tieline 146 is provided between the first electrode lead 140 and the first conductive strip 132, and a second electrode tieline 186 is provided between the second electrode lead 180 and the second metal conductive layer 170, where the first electrode tieline 146 and the second electrode tieline 186 are both continuous conductive wires. When the first electrode lead 140 and the second electrode lead 180 are electrically connected with the first metal conductive layer 130 and the second metal conductive layer 170, it is hard to avoid misalignment. The first connecting portion 144 is electrically connected to the first metal conductive layer 130 via the first electrode tieline 146, and the second connecting portion 184 is electrically connected to the second metal conductive layer 170 via the second electrode tieline 186. Since the first electrode tieline 146 and the second electrode tieline 186 are both continuous conductive wires, in this way, even if the conductive grids of the first metal conductive layer and the second metal conductive layer have different grid cycles, it can also ensure that the effect of electrical connection of the first electrode lead 140 and the first metal conductive layer 130 is good, and the effect of electrical connection of the second electrode lead 180 and the second metal conductive layer 170 is good.

In order to highlight the first electrode tieline 146, the second electrode tieline 186 in FIG. 7 and FIG. 8, the first electrode tieline 146, the second electrode tieline 186 are thicker than the conductive wires constituting the first electrode lead 140, the second electrode lead 180, but it should not define that the first electrode tieline 146, the second electrode tieline 186 are thicker than the thin metal wires constituting the first electrode lead 140, the second electrode lead 180. In a specific application, the thickness of the first electrode tieline 146 and the second electrode tieline 186 can be determined upon the application environment.

It should be noted that, even without providing the first electrode tieline 146 and the second electrode tieline 186, it can also achieve that the first electrode lead 140 is electrically connected with the first metal conductive layer 130, and the second electrode lead 180 is electrically connected with the second metal conductive layer 170.

The above described embodiments merely show some implementing modes of the present invention with specific details, they should not be considered as limiting the scope of the present invention. It should be noted that, modifications and improvements can be made by persons skilled in the art without departing from the concept of the present invention, and such modifications or improvements should fall within the scope of the present invention. Accordingly, the scope of the present invention should be subject to the claims.

What is claimed is:

1. A touch screen, comprising a substrate, wherein the touch screen further comprises:
   a first embossing adhesive layer, formed on a side of the substrate, wherein a first metal conductive layer is embedded in the first embossing adhesive layer, the first metal conductive layer comprises a plurality of first conductive strips mutually insulated from each other, wherein the substrate is soda lime glass or aluminosilicate glass, and siloxy of a surface of the substrate adjacent to the first embossing adhesive layer is bonded with the first embossing adhesive layer;
   a first electrode lead, formed on the first embossing adhesive layer and electrically connected with the first conductive strip;
   a transparent insulating film, comprising a first surface and a second surface opposite to the first surface, wherein the first surface faces the first embossing adhesive layer;
   a second embossing adhesive layer, formed on the second surface of the transparent insulating film, wherein a second metal conductive layer is embedded in the second embossing adhesive layer, the second metal conductive layer comprises a plurality of second conductive strips mutually insulated from each other;
   a second electrode lead, formed on the second embossing adhesive layer and electrically connected with the second conductive strip; and a first slot provided in the transparent insulating film, and a second slot provided in the second embossing adhesive layer, wherein the first slot and the second slot both directly face a free end of the first electrode lead, and a free end of the second electrode lead is positioned around the second slot;
   wherein the first electrode lead and the second electrode lead are both a grid structure formed by cross-connecting of conductive wires in a grid;
   wherein the first conductive strip and the second conductive strip each comprises a conductive grid composed of a plurality of metal wires, wherein projection of the conductive grid of the first conductive strip on the second metal conductive layer overlaps the conductive grid of the second conductive strip;
   wherein a strip-shaped first connecting portion formed by cross-connecting conductive wires in a grid is provided at an end of the first electrode lead, and the first connecting portion is wider than other parts of the first electrode lead; and a strip-shaped second connecting portion formed by cross-connecting conductive wires in a grid is provided at an end of the second electrode lead and the second connecting portion is wider than other parts of the second electrode lead;
   wherein a first electrode tieline is connected to the strip-shaped first connecting portion and a second electrode tieline is connected to the strip-shaped second connecting portion, and the first electrode tieline and the second electrode tieline are rectangular and continuous conductive wires, and wherein the first electrode tieline is electrically connected with at least two metal wires of the first conductive strip, the second electrode tieline is electrically connected with at least two metal wires of the second conductive strip;

wherein the second embossing adhesive layer is formed directly on the second surface of the transparent insulating film.

2. The touch screen according to claim 1, wherein the touch screen further comprises an optical transparent adhesive layer, the optical transparent adhesive layer is provided between the first embossing adhesive layer and the first surface of the transparent insulating film, wherein a third slot is provided in the optical transparent adhesive layer and directly faces the free end of the first electrode lead.

3. The touch screen according to claim 1, wherein a first patterned groove is provided on a side of the first embossing adhesive layer away from the substrate, wherein metal wires of the first metal conductive layer are accommodated in the first groove; and a second patterned groove is provided on a side of the second embossing adhesive layer away from the second surface of the transparent insulating film, wherein metal wires of the second metal conductive layer are accommodated in the second groove.

4. The touch screen according to claim 3, wherein a depth to width ratio of the first groove is not less than 1, and a depth to width ratio of the second groove is not less than 1.

5. The touch screen according to claim 3, wherein roughness of the surface of the substrate adjacent to the first embossing adhesive layer is 5~10 nm.

6. The touch screen according to claim 1, wherein metal wires of the first conductive strip are attached to the substrate, and the first conductive strip is located between the substrate and the first embossing adhesive layer.

7. The touch screen according to claim 1, wherein a grid cycle of the first electrode lead and the second electrode lead are both less than a grid cycle of the first metal conductive layer and the second metal conductive layer.

8. The touch screen according to claim 1, wherein the strip-shaped first connecting portion and the first electrode tieline have the same width, and the strip-shaped second connecting portion and the second electrode tieline have the same width.

* * * * *